United States Patent
Blain

(10) Patent No.: US 10,215,222 B2
(45) Date of Patent: Feb. 26, 2019

(54) UNIVERSAL JOINT WITH SIMPLIFIED STRUCTURE

(71) Applicant: Airbus Operations (SAS), Toulouse (FR)

(72) Inventor: David Blain, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 533 days.

(21) Appl. No.: 15/065,321

(22) Filed: Mar. 9, 2016

(65) Prior Publication Data
US 2016/0265585 A1 Sep. 15, 2016

(30) Foreign Application Priority Data
Mar. 10, 2015 (FR) ...................... 15 51965

(51) Int. Cl.
*F16D 3/42* (2006.01)
*F16C 11/12* (2006.01)
*F16D 3/00* (2006.01)

(52) U.S. Cl.
CPC ................ *F16C 11/12* (2013.01); *F16D 3/42* (2013.01); *F16D 3/005* (2013.01)

(58) Field of Classification Search
CPC ..... F16D 3/16; F16D 3/42; F16D 3/56; F16D 3/64; F16C 11/12
See application file for complete search history.

(56) References Cited

U.S. PATENT DOCUMENTS

| 3,150,506 A | * | 9/1964 | Alcaro | F16D 3/72 464/78 |
| 3,393,535 A | | 7/1968 | Morin | |
| 3,597,938 A | | 8/1971 | Hellen et al. | |
| 3,811,172 A | | 5/1974 | Bilinski et al. | |
| 5,302,044 A | | 4/1994 | Spariat et al. | |
| 5,445,471 A | * | 8/1995 | Wexler | B60R 22/195 16/225 |

FOREIGN PATENT DOCUMENTS

EP 0524046 1/1993

OTHER PUBLICATIONS

French Search Report, dated Feb. 2, 2016, priority document.

* cited by examiner

*Primary Examiner* — Daniel J Wiley
(74) *Attorney, Agent, or Firm* — Greer, Burns & Crain, Ltd.

(57) ABSTRACT

A universal joint comprising a first band, a second band, and a third band. The three bands are cylindrical bands coaxial with one another with respect to a common axis. The first band and the second band are separated by a first slot, and the second band and the third band are separated by a second slot. Two connection points, which are diametrically opposed, assure the connection of the first band and of the second band. Two other connection points, which are diametrically opposed, assure the connection of the second band and of the third band. The two connection points between the first band and the second band are offset by substantially 90° in rotation about the common axis with respect to the two connection points between the second band and the third band.

6 Claims, 2 Drawing Sheets

UNIVERSAL JOINT WITH SIMPLIFIED STRUCTURE

CROSS-REFERENCES TO RELATED APPLICATIONS

This application claims the benefit of the French patent application No. 1551965 filed on Mar. 10, 2015, the entire disclosures of which are incorporated herein by way of reference.

BACKGROUND OF THE INVENTION

The present invention relates to a universal joint having a simplified structure, i.e., having a reduced number of constituent parts and without frictional relative movement.

A universal joint is a mechanical component which makes it possible to connect two elements such as shafts or tubes which may move relative to one another.

A universal joint has a first axis which is aligned between the two elements. The universal joint assures two rotations, of which the axes are perpendicular to one another and perpendicular to the first axis.

A universal joint is formed from a multiplicity of parts that are movable relative to one another, which makes the joint bulky and generally heavy and also costly to produce.

SUMMARY OF THE INVENTION

An object of the present invention is to propose a universal joint of simplified structure which no longer has the disadvantages of the prior art and which in particular has a simple structure.

To this end, a universal joint is proposed comprising:
a first band,
a second band,
a third band, the three bands being cylindrical bands coaxial with one another with respect to a common axis, the first band and the second band being separated by a first slot, and the second band and the third band being separated by a second slot,
two connection points, which are diametrically opposed, assuring the connection of the first band and of the second band,
two other connection points, which are diametrically opposed, assuring the connection of the second band and of the third band, the two connection points between the first band and the second band being offset by substantially 90° in rotation about the common axis with respect to the two connection points between the second band and the third band.

A universal joint of this type thus makes it possible to assure double rotation with a simplified structure.

The universal joint advantageously also comprises a bellows having two ends, the three bands being disposed internally of the bellows and one of the ends of the bellows being fixed to the first band, and the other end of the bellows being fixed to the third band.

Each connection point is advantageously a plate disposed in a radial plane internally of the bands and extending on either side of the slot, the parts of the plate extending beyond the slot being fixed to the bands delimiting said slot, and the plate having an extension which is positioned between the two bands delimiting the slot.

The plate advantageously has, in a radial direction, a tapering in the continuation of the extension.

Each slot is advantageously laid out such that the connection points are in a plane perpendicular to the common axis.

The first slot advantageously has a maximum at each of the two connection points, the second slot has a minimum at each of the two connection points, and the four extrema are located at the same height.

BRIEF DESCRIPTION OF THE DRAWINGS

The above-mentioned features of the invention as well as further features will become clearer upon reading the following description of an exemplary embodiment, said description being provided with reference to the accompanying drawings, in which.

DETAILED DESCRIPTION OF THE PREFERRED EMBODIMENTS

Figure 1:
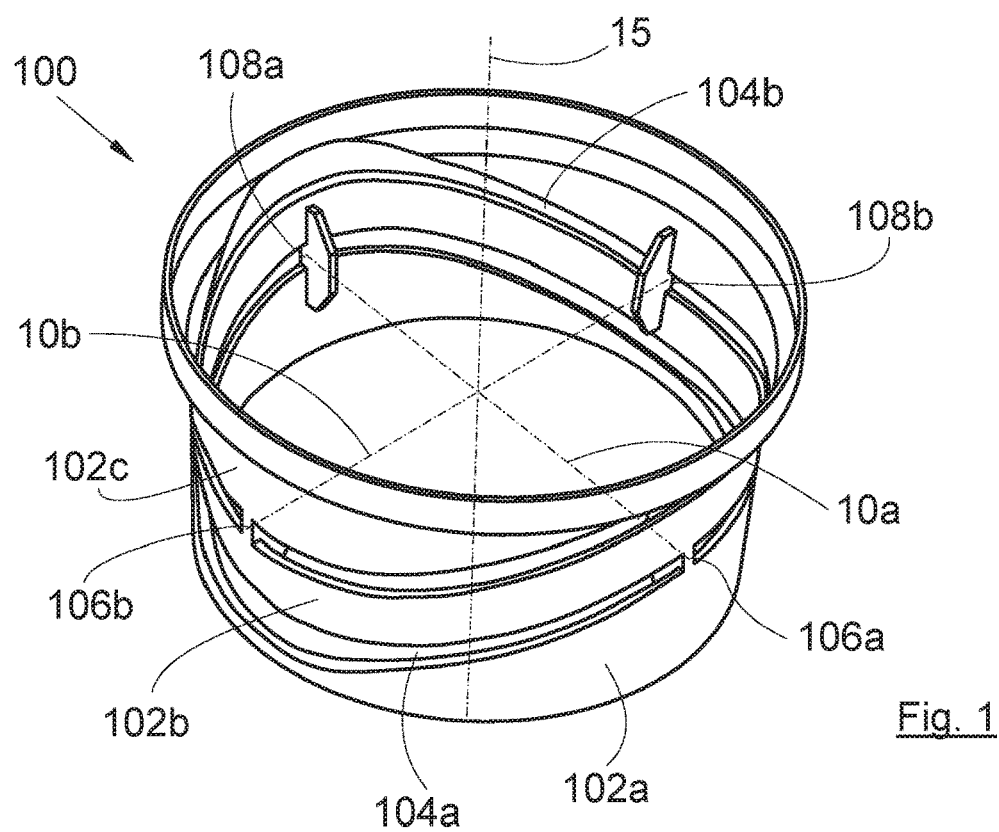
FIG. 1 is a perspective view of a universal joint according to the invention.

FIG. 1 shows a universal joint 100 which has the general form of a cylinder of revolution, of which the axis is referenced 15.

The universal joint 100 comprises a first band 102a, a second band 102b and a third band 102c. The three bands 102a-c are cylindrical bands which are coaxial with one another and which are disposed adjacently in the direction of their common axis 15. Viewed from the axis 15, the three bands 102a-c are circular.

A first slot 104a separates the first band 102a and the second band 102b, and a second slot 104b separates the second band 102b and the third band 102c.

In order to ensure that the bands 102a-c are held together, the first band 102a is connected to the second band 102b by two diametrically opposed connection points 106a and 108a, and the second band 102b is connected to the third band 102c by two other diametrically opposed connection points 106b and 108b. The connection points 106a-b and 108a-b thus interrupt the slots 104a-b.

The two connection points 106a and 108a between the first band 102a and the second band 102b are offset by substantially 90°, i.e., by 90°±5°, in rotation about the common axis 15 with respect to the two connection points 106b and 108b between the second band 102b and the third band 102c. The angular offset between the connection points 106a and 108a is thus approximately a quarter of a circle.

The first band 102a and the second band 102b can thus pivot relative to one another about a first axis of rotation 10a passing through the two connection points 106a and 108a.

The second band 102b and the third band 102c can thus pivot relative to one another about a second axis of rotation 10b passing through the two connection points 106b and 108b.

The slots 104a and 104b allow the bands 102a-c to shift angularly and may come into contact, creating an angular stop. Thus, when two elements are fixed on either side of the universal joint 100, i.e., one is fixed to the first band 102a and the other is fixed to the third band 102c, the universal joint 100 makes it possible to assure a double rotation.

The design of the universal joint 100 is thus simplified since the universal joint 100 is formed from a one-piece assembly.

Figure 2:
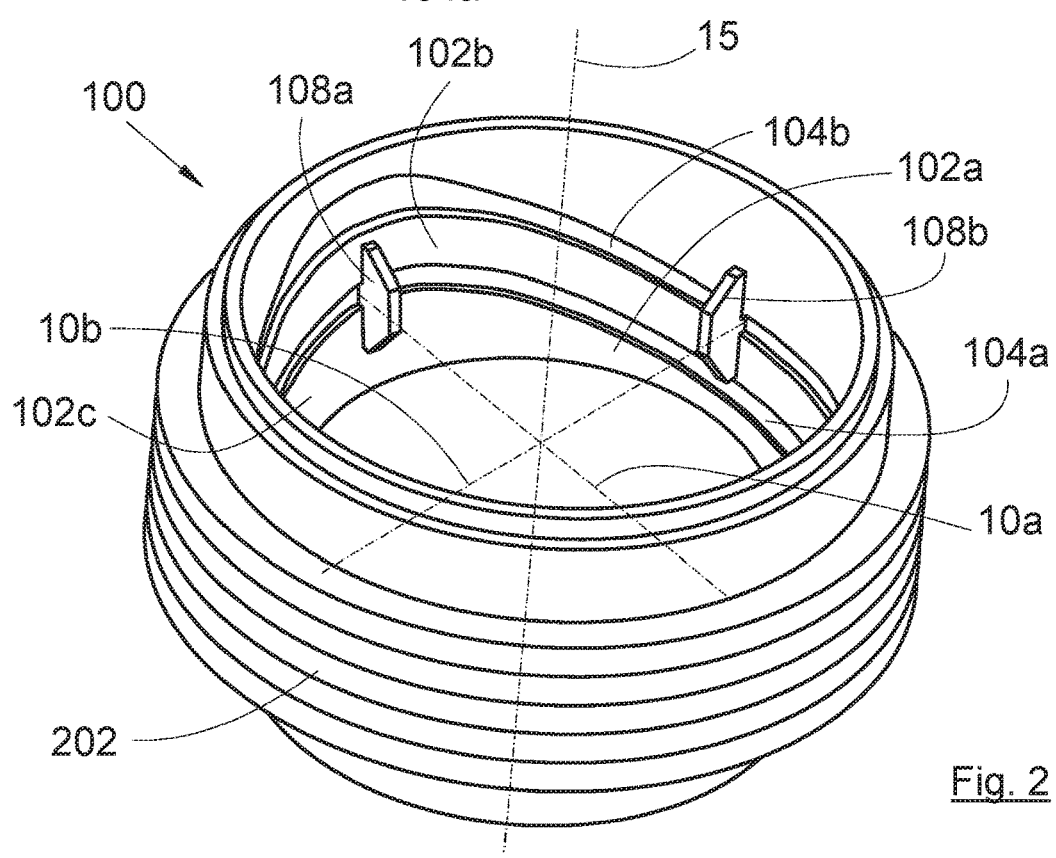
FIG. 2 is a perspective view of a universal joint in accordance with a particular embodiment of the invention.
Figure 3:
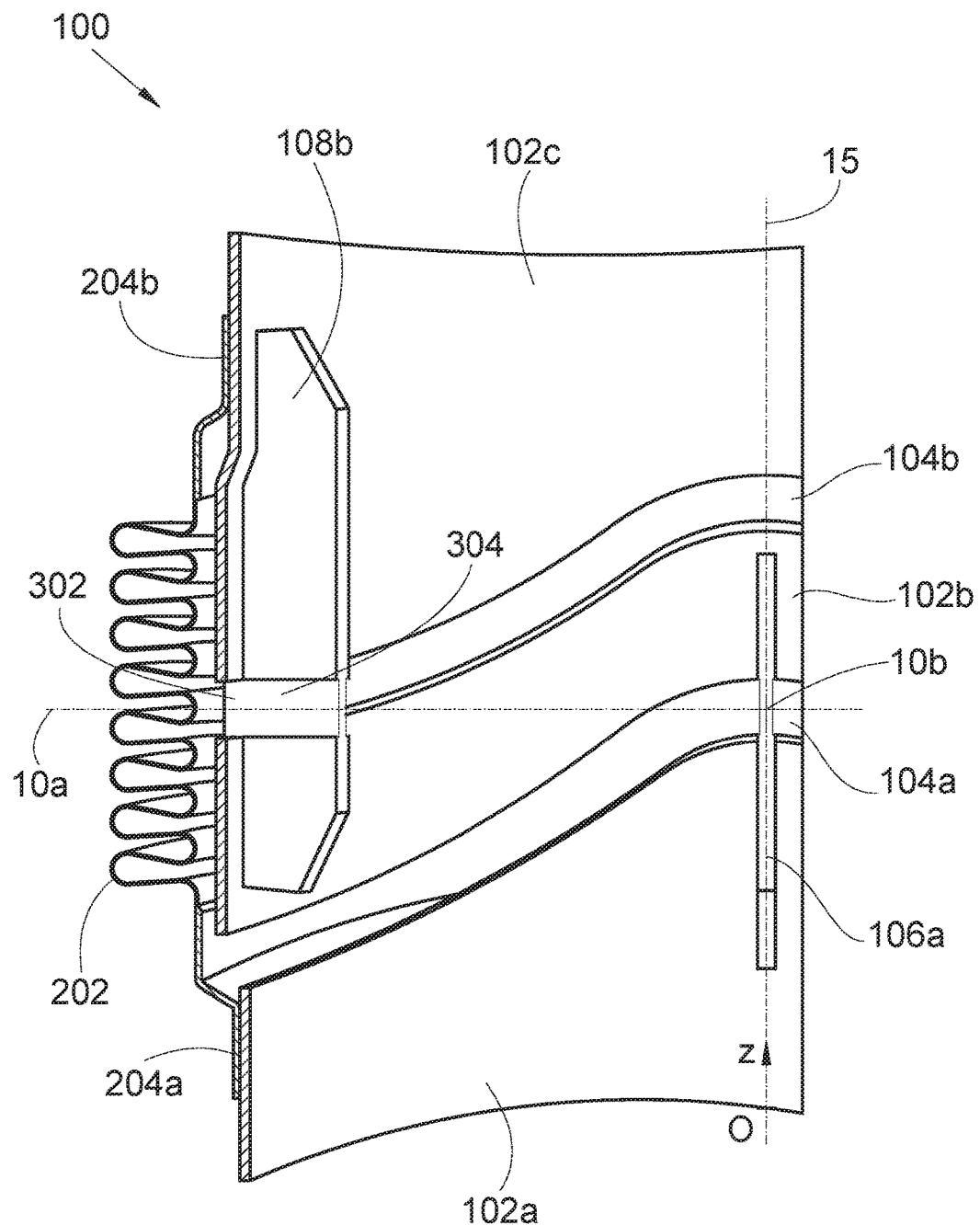
FIG. 3 shows the universal joint of FIG. 2, viewed in section along a radial plane.

In the embodiment of FIG. 2 and of FIG. 3 the universal joint 100 is provided with a bellows 202 which also takes the form of a cylinder having as axis the common axis 15. The three bands 102a-c are disposed internally of the bellows 202. The bellows 202 comprises two ends 204a and 204b, of which one is fixed to the first band 102a and of which the other is fixed to the third band 102c.

The bellows 202 makes it possible to ensure the tightness of the universal joint 100 with respect to the exterior environment.

The connection points 106a-b and 108a-b can take different forms. The bands 102a-c can be formed from a cut tube and the connection points 106a-b and 108a-b can then be points that have not been cut, i.e., the connection points 106a-b and 108a-b form a material continuity with the bands 102a-c.

In the embodiment of the invention shown in the drawings, each connection point 106a-b, 108a-b is a plate disposed in a radial plane internally of the bands 102a-c and extending on either side of the slot 104a-b. The parts of the plate extending beyond the slot 104a-b are fixed to the bands 102a-c delimiting said slot 104a-b. To assure the spacing of the slot 104a-b at the plate, the plate has an extension 302 forming a spacer positioned between the two bands 102a-c delimiting the slot 104a-b.

The plates make it possible to hold the three bands 102a-c in spite of the forces tending to distance said bands from one another.

To assure an improved fixing, it is preferable for the surface in contact with the plate and the bands 102a-c to be relatively large, which can be obtained by using a relatively long and thick plate. Conversely, in order to assure an improved rotation at the connection point 106a-b, 108a-b, it is preferable for the thickness of the plate to be relatively thin. To satisfy a conflict of this type, the plate has, in the radial direction, a tapering 304 in the thickness of the plate, Of course, the thicknesses of the plates could be modified depending on the desired rigidity for the universal joint 100.

As can be seen in FIG. 3 and so as to provide stable operation of the universal joint 100, it is preferable for the first axis of rotation 10a and the second axis of rotation 10b to be perpendicular to the common axis 15 and for the axes of rotation 10a-b and the common axis 15 to have a common point of intersection.

For this, each slot 104a-b is laid out such that the connection points 106a-b and 108a-b are in the same plane perpendicular to the common axis 15.

Here, the two slots 104a-b follow parallel layouts which have their extrema at each connection point 106a-b, 108a-b.

Assuming an origin O on the common axis 15, said origin being located at the end of the universal joint 100 where the first band 102a is located and having a vector $\vec{z}$ which is the direction vector of the common axis 15 and which is oriented from the first band 102a to the third band 102c, the first slot 104a has a maximum at each of the two connection points 106a and 108a, the second slot 104b has a minimum at each of the two connection points 106b and 108b, and the four extrema are positioned at the same height in accordance with $\vec{z}$.

Depending on the forces it is likely to be subjected to, the universal joint 100 can be made of any suitable materials, such as metal or plastic.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A universal joint comprising:
   a first band,
   a second band,
   a third band, the three bands being cylindrical bands coaxial with one another with respect to a common axis, the first band and the second band being separated by a first slot, and the second band and the third band being separated by a second slot,
   two connection points, which are diametrically opposed, assuring the connection of the first band and of the second band,
   two other connection points, which are diametrically opposed, assuring the connection of the second band and of the third band, the two connection points between the first band and the second band being offset by substantially 90° in rotation about the common axis with respect to the two connection points between the second band and the third band.

2. The universal joint as claimed in claim 1, further comprising a bellows having two ends, wherein the three bands are disposed internally of the bellows, and wherein one of the ends of the bellows is fixed to the first band, and the other end of the bellows is fixed to the third band.

3. The universal joint as claimed in claim 1, wherein each connection point is a plate disposed in a radial plane internally of the bands and extending on either side of the slot, wherein the parts of the plate extending beyond the slot are fixed to the bands delimiting said slot, and wherein the plate has an extension which is positioned between the two bands delimiting the slot.

4. The universal joint as claimed in claim 3, wherein the plate has, in a radial direction, a tapering in a continuation of the extension.

5. The universal joint as claimed in claim 1, wherein each slot is laid out such that the connection points are in the same plane perpendicular to the common axis.

6. The universal joint as claimed in claim 5, wherein the first slot has a maximum at each of the two connection points, wherein the second slot has a minimum at each of the two connection points, and wherein the four extrema are positioned at the same height.

* * * * *